(12) United States Patent
Krankkala et al.

(10) Patent No.: US 9,039,092 B1
(45) Date of Patent: May 26, 2015

(54) AIR BAG ENABLING CAR SEAT COVER

(75) Inventors: Ken Krankkala, Anthem, AZ (US); C. Kwai Kong, Gilroy, CA (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 670 days.

(21) Appl. No.: 13/342,641

(22) Filed: Jan. 3, 2012

Related U.S. Application Data

(60) Provisional application No. 61/429,685, filed on Jan. 4, 2011.

(51) Int. Cl.
*B60R 21/207* (2006.01)

(52) U.S. Cl.
CPC ....... *B60R 21/207* (2013.01); *B60R 2021/2076* (2013.01)

(58) Field of Classification Search
CPC ................. B60R 21/207; B60R 2021/2076
USPC .......... 297/216.13, 452.41, 218.1, 218.2, 297/218.3, 218.5, 452.58, 452.6, 452.62; 280/730.2, 730.1
See application file for complete search history.

(56) References Cited

U.S. PATENT DOCUMENTS

| | | | | |
|---|---|---|---|---|
| 2,266,505 | A * | 12/1941 | McCormick | 297/228.1 |
| 4,396,227 | A * | 8/1983 | Neilson | 297/228.11 |
| 5,234,252 | A * | 8/1993 | Wallach | 297/229 |
| 5,235,826 | A * | 8/1993 | Brooks et al. | 66/169 R |
| 5,265,933 | A * | 11/1993 | Croshaw | 297/228.1 |
| 5,556,129 | A * | 9/1996 | Coman et al. | 280/730.2 |
| 5,647,609 | A * | 7/1997 | Spencer et al. | 280/730.2 |
| 5,651,582 | A * | 7/1997 | Nakano | 297/216.13 |
| 5,676,394 | A * | 10/1997 | Maly | 280/728.3 |
| 5,738,368 | A * | 4/1998 | Hammond et al. | 280/730.1 |
| 5,762,363 | A * | 6/1998 | Brown et al. | 280/730.2 |
| 5,803,539 | A * | 9/1998 | Dewar et al. | 297/228.12 |
| 5,829,779 | A * | 11/1998 | Nakashima et al. | 280/730.2 |
| 5,857,696 | A * | 1/1999 | Inoue et al. | 280/728.2 |
| 5,863,063 | A * | 1/1999 | Harrell | 280/730.2 |
| 5,893,579 | A * | 4/1999 | Kimura et al. | 280/730.2 |
| 6,003,938 | A * | 12/1999 | Lachat et al. | 297/216.13 |
| 6,099,067 | A * | 8/2000 | Butterworth | 296/136.07 |
| 6,302,431 | B1 * | 10/2001 | Sasaki et al. | 280/728.2 |
| 6,345,866 | B1 * | 2/2002 | Jackson et al. | 297/228.12 |
| 6,450,528 | B1 * | 9/2002 | Suezawa et al. | 280/730.2 |
| 6,523,237 | B1 * | 2/2003 | Kopec et al. | 29/91.1 |
| 6,626,455 | B2 * | 9/2003 | Webber et al. | 280/728.2 |
| 7,100,992 | B2 * | 9/2006 | Bargheer et al. | 280/730.2 |
| 7,654,562 | B2 * | 2/2010 | Klima et al. | 280/730.2 |
| 7,669,889 | B1 * | 3/2010 | Gorman et al. | 280/730.2 |
| 7,896,388 | B2 * | 3/2011 | Sugimoto et al. | 280/730.2 |
| 8,171,868 | B2 * | 5/2012 | Evans et al. | 112/475.08 |
| 8,672,352 | B2 * | 3/2014 | Tracht et al. | 280/743.2 |
| 8,702,120 | B2 * | 4/2014 | Kalisz et al. | 280/730.1 |

(Continued)

*Primary Examiner* — Anthony D Barfield
(74) *Attorney, Agent, or Firm* — Booth Udall Fuller, PLC

(57) ABSTRACT

The present disclosure describes a method of manufacture and a structure for an automobile seat cover that includes a seat cover body with an outer perimeter, a seat cover skirt with a first edge sewn with an overlock stitch to the seat cover body for a majority of the outer perimeter, and a second edge, distal from the first edge, comprising a tie element extending for a majority of the second edge around a seat opening in the seat cover. A portion of the seat cover skirt and the seat cover body corresponding to a location of at least one airbag installed in an automobile seat cover over which the seat cover is to be placed are sewn together with one of a straight stitch and a lock stitch instead of the overlock stitch. In some implementations, the thread used is a brightly colored string.

8 Claims, 4 Drawing Sheets

(56) References Cited

U.S. PATENT DOCUMENTS

| | | | |
|---|---|---|---|
| 2002/0020992 A1* | 2/2002 | Kanuma | 280/730.2 |
| 2002/0043834 A1* | 4/2002 | Jackson et al. | 297/228.1 |
| 2004/0126532 A1* | 7/2004 | Gardner | 428/43 |
| 2004/0187277 A1* | 9/2004 | Akashi et al. | 24/584.1 |
| 2004/0251721 A1* | 12/2004 | Yoshida | 297/250.1 |
| 2005/0104338 A1* | 5/2005 | Soderquist | 280/728.3 |
| 2005/0258624 A1* | 11/2005 | Abraham et al. | 280/728.3 |
| 2006/0113767 A1* | 6/2006 | Tracht | 280/730.2 |
| 2007/0057493 A1* | 3/2007 | Ritzel et al. | 280/730.2 |
| 2007/0145797 A1* | 6/2007 | Itakura | 297/228.1 |
| 2007/0222191 A1* | 9/2007 | Tracht | 280/730.2 |
| 2008/0290643 A1* | 11/2008 | Hansen | 280/801.1 |
| 2008/0290705 A1* | 11/2008 | Neustat et al. | 297/225 |
| 2009/0033081 A1* | 2/2009 | Flischer et al. | 280/743.2 |
| 2009/0315373 A1* | 12/2009 | Thomas et al. | 297/216.13 |
| 2011/0291447 A1* | 12/2011 | Mount et al. | 297/216.13 |
| 2013/0026803 A1* | 1/2013 | Islam et al. | 297/216.13 |
| 2013/0257120 A1* | 10/2013 | Tracht et al. | 297/216.13 |
| 2014/0191545 A1* | 7/2014 | Satmary | 297/228.1 |

* cited by examiner

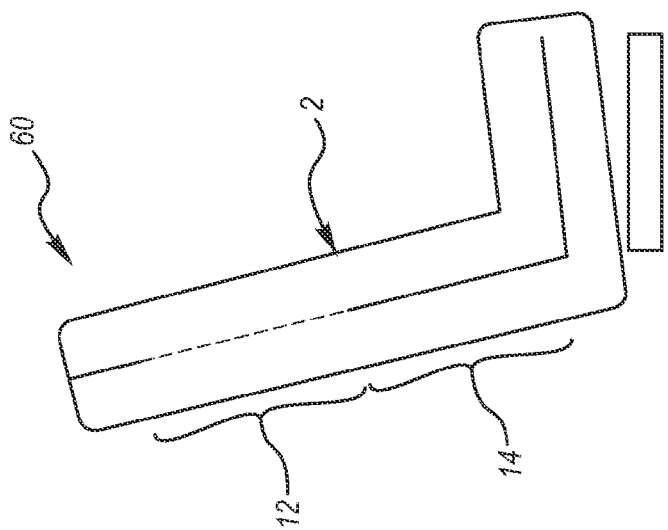
FIG. 5
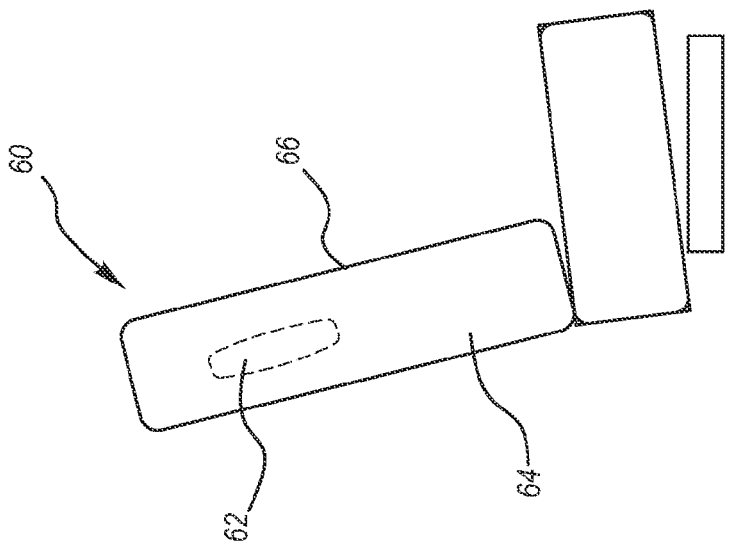
FIG. 6A
FIG. 6B

AIR BAG ENABLING CAR SEAT COVER

CROSS REFERENCE TO RELATED APPLICATIONS

This document claims the benefit of the filing date of U.S. Provisional Patent Application 61/429,685 entitled "SAFETY STITCH FOR CAR SEAT COVERS" to Ken Krankkala which was filed on Jan. 4, 2011, the contents of which are hereby incorporated by reference.

BACKGROUND

1. Technical Field

Aspects of this document relate generally to automobile seat covers.

2. Background Art

Automobile seat covers are an accessory that has become common among consumers as they try to protect their automobile investment. Various seat covers allow consumers to not only protect their seats from the usual wear and tear, but also allow the consumer to add their own custom style and/or personality to the vehicle. Technology in automobiles, however, has advanced through the years, including the incorporation of airbags and other safety within the car's seat. The addition of seat covers often impairs the use of the seat airbags and safety devices due to the airbag release ports and safety device openings being covered by the seat cover.

SUMMARY

Aspects of an automobile seat cover may comprise a seat cover body comprising an outer perimeter, a seat cover skirt comprising a first edge sewn with an overlock stitch to the seat cover body for a majority of the outer perimeter, and a second edge, distal from the first edge, comprising a tie element extending for a majority of the second edge around a seat opening in the seat cover, wherein at least one portion of the seat cover skirt and the seat cover body are sewn together with one of a straight stitch and a lock stitch instead of the overlock stitch, the at least one portion positioned on the seat cover corresponding to a location of at least one airbag installed in an automobile seat over which the seat cover is to be placed.

Particular embodiments and implementations may comprise one or more of the following features. The at least one portion of the seat cover skirt and the seat cover body may comprise at least two portions of the seat cover skirt and the seat cover body sewn together with the one of a straight stitch and a lock stitch instead of the overlock stitch, the at least two portions positioned on the opposing edges of the seat cover body. The overlock stitch may use a first string color and the one of a straight stitch and a lock stitch uses a second string color different from the first string color. The second string color may be a brightly colored string color. The second string color may be orange. Each of the seat cover skirt and the seat cover body may comprise overlock stitching along their respective perimeters. The seat cover body may further comprise a padded surface layer.

Aspects of an automobile seat cover may comprise an automobile seat cover comprising a seat cover body comprising an outer perimeter, and a seat cover skirt comprising at least one first edge portion, stitched by a first stitch to the seat cover body for a majority of an outer perimeter of the seat cover body, at least two second edge portions opposing each other on the outer perimeter of the seat cover body, each second edge portion stitched by a second stitch different from the first stitch for a remainder of a stitched outer perimeter portion of the seat cover body, wherein the second stitch is weaker and more prone to breakage than the first stitch, and a tie element coupled to the seat cover skirt distal from the first edge portion and the second edge portions, the tie element extending for a majority of the seat cover skirt around a seat opening in the seat cover, wherein a majority of the first and second edges of the seat cover body and the seat cover skirt comprise an overlock stitch, and wherein the at least one second edge is positioned on an automobile seat cover corresponding to at least one airbag installed in an automobile seat over which the seat cover is to be placed.

Particular embodiments and implementations may comprise one or more of the following features. The first stitch may comprise at least an overlock stitch. Each of the seat cover skirt and the seat cover body may be separately finished with an overlock stitch and subsequently stitched together. The first stitch may be at least one of a cover stitch, an overlock stitch, a zigzag stitch, two parallel straight stitches and two parallel lock stitches. The second stitch may include one of a single straight stitch and a single lock stitch.

Aspects of a method of making a seat cover may comprise sewing a seat cover body to a seat cover skirt for a majority of an outer perimeter of the seat cover body and a first edge of the seat cover skirt with a first stitch, sewing at least a first portion of the seat cover body to a first portion of the first edge of the seat cover skirt with a second stitch different from and weaker than the first stitch, the first portion of the first edge of the seat cover skirt, the first portion of the first edge of the seat cover skirt positioned on the seat cover skirt corresponding to a location of at least one airbag installed in an automobile seat over which the seat cover is to be placed, and sewing a tie element to a majority of a second edge of the seat cover skirt opposite the first edge of the seat cover skirt.

Particular embodiments and implementations may comprise one or more of the following features. The first stitch may be an overlock stitch. Each of the seat cover skirt and the seat cover body may be separately finished with an overlock stitch and subsequently stitched together. The first stitch may include at least one of a cover stitch, an overlock stitch, a zigzag stitch, two parallel straight stitches and two parallel lock stitches. The second stitch may be one of a single straight stitch and a single lock stitch.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for," and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIG. 5 is a rear view of a particular implementation of an automobile seat cover;

FIG. 6A is a side view of a particular embodiment of an automobile seat comprising at least one airbag positioned in a side of the seat back; and FIG. 6B is a side view of a particular implementation of a seat cover enclosing the automobile seat of FIG. 6A.

DESCRIPTION

This disclosure, its aspects and implementations, are not limited to the specific components or assembly procedures disclosed herein. Many additional components and assembly procedures known in the art consistent with the intended automobile seat cover and/or assembly procedures for an automobile seat cover will become apparent for use with implementations of the automobile seat cover from this disclosure. Accordingly, for example, although particular automobile seat covers are disclosed, such automobile seat covers and implementing components may comprise any shape, size, style, type, model, version, measurement, concentration, material, quantity, and/or the like as is known in the art for such automobile seat covers and implementing components, consistent with the intended operation of an automobile seat cover.

Figure 1:
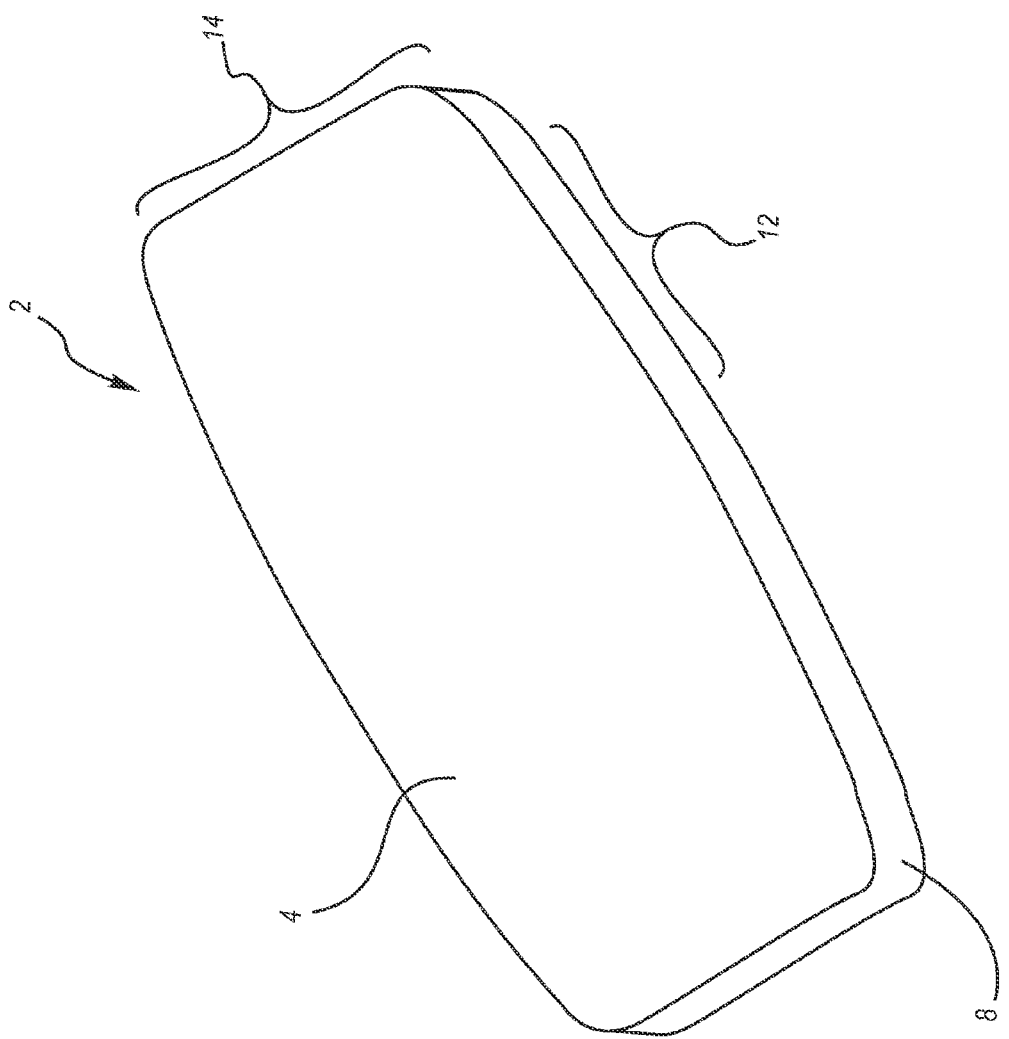
FIG. 1 is a perspective view of a particular implementation of an automobile seat cover.

FIG. 1 illustrates a perspective view of an outer surface of a particular implementation of the seat cover 2 comprising a seat cover body 4 comprising an outer perimeter 6. The seat cover 2 comprises, among other things, a seat cover skirt 8 comprising a first edge 10 (FIG. 2) wherein the outer perimeter edge 11 (FIG. 2) of the seat cover body is coupled to the first edge 10 of the seat skirt 8 for a majority of the edges with a first stitching 14 and the outer perimeter edge 11 of the seat cover body and the seat cover skirt's first edge 10 are coupled together with a second stitching 12 for the remainder of the edges, wherein the first stitching is stronger and sturdier than the second stitching. The second stitching 12 is used in areas of the seat cover body 4 that will correspond to the location of an air bag or other safety feature on an automobile seat so that the weaker stitching bursts under the force of the air bag should the air bag deploy. In other words, if the same force were exerted on the second stitching 12 and the first stitching 14 and slowly increased, the second stitching 12 would break before the first stitching 14.

Figure 2:
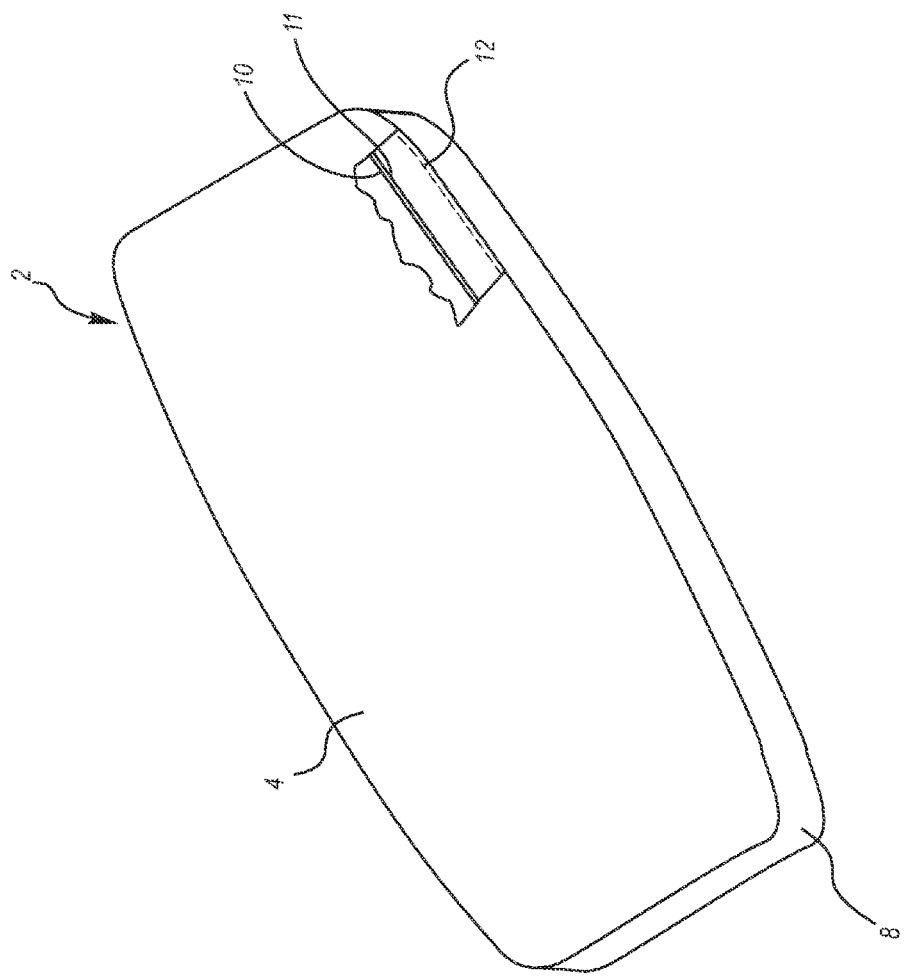
FIG. 2 is a cut-away view of a particular implementation of an automobile seat cover.

FIG. 2 is a cut-away view of the seat cover 2 of FIG. 1 illustrating a portion of the outer perimeter edge 11 of the seat cover body 4 sewed to the first edge 10 of the seat cover skirt 8. During manufacture, the seat cover body 4 and seat cover skirt 8 are sewn together about their respective perimeters and the entire seat cover is then turned inside out with the sewn together edges on the inside of the completed seat cover.

Figure 3A:
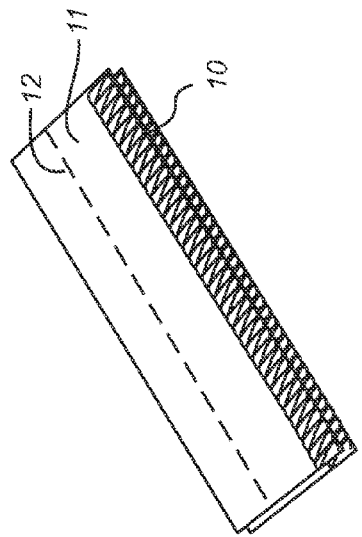
FIG. 3A is a perspective view of a particular implementation of a seat cover body and skirt edge stitched with a straight stitch.
Figure 3B:
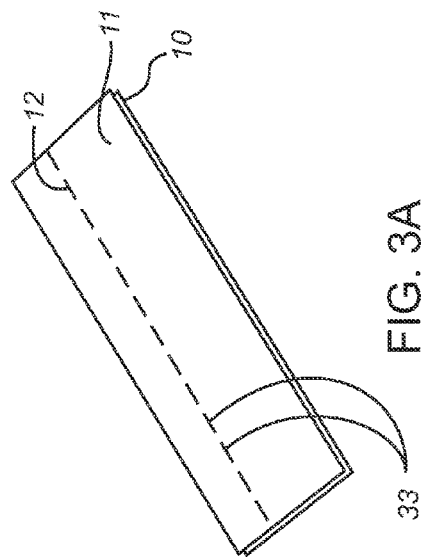
FIG. 3B is a perspective view of a particular implementation of a seat cover body and skirt edge sewn together with a straight stitch where each edge is finished with an overlock stitch.

FIG. 3A illustrates a portion of the edges 10 and 11 of the respective seat cover skirt 8 and seat cover body 4 stitched together with the second stitching 12, in this case a straight stitch along the seat cover skirt's first edge 10 and the seat cover body's outer perimeter edge 11 to sew the two edges together. There are different types of "straight stitches", for example a straight stitch is a type of straight stitch, but for purposes of this disclosure they will all be referred to as a straight stitch. The straight stitching provides a few stitch points 33 along a determined path length 30 for the second stitching 12 and thereby provides a frail stitching that will hold together during installation and normal use of the seat cover 2 on the seat, but give way under force of an airbag deploying from a seat beneath the seat cover 2. FIG. 3B illustrates a portion of the edges 10 and 11 of the respective seat cover skirt 8 and seat cover body 4 stitched together with the second stitching 20, but each of the individual seat cover skirt edge 10 and the seat cover body edge 11 are separately finished with overlock stitching to prevent the edges from fraying. Just like the embodiment in FIG. 3A, the seat cover skirt's first edge 10 and the seat cover body's edge 11 are sewn together only by the second stitching 20 in the form of a straight stitch. Any embodiments of the seat cover 2 may have edges first finished with overlock stitching or other edge finishing stitching in addition to the other first stitching 12 or second stitching 14 without affecting the strength of the stitch binding the two edges together.

In various particular embodiments of the automobile seat cover 2, the second stitching 12 is made from thread of a first color, whereas the first stitching 14 is made from thread of a second color different from the first color. In particular embodiments, the second stitching 12 is made of a brightly colored thread, allowing a user to easily determine the location of the second stitching, and corresponding location for airbag positioning, on the automobile seat cover. For example, a bright orange thread may be used.

Figure 4A:
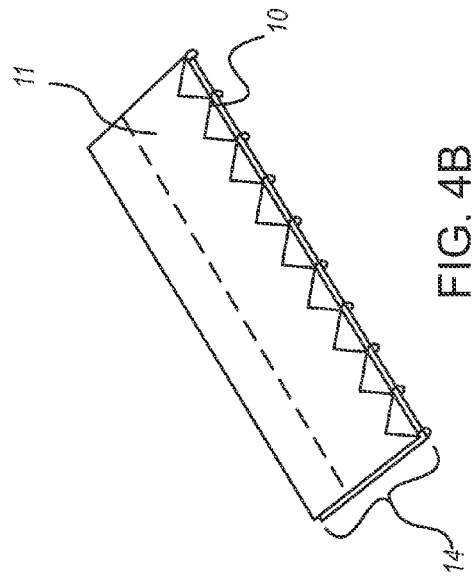
FIG. 4A is a perspective view of a particular implementation of a seat cover body and skirt edge sewn together with an overlock stitch.

FIG. 4A illustrates a portion of the edges 10, 11 of the respective seat cover skirt 8 and seat cover body 4 stitched together with the first stitching 14 along a majority of the edges in the automobile seat cover 2. In the embodiment shown in FIG. 4A, the first stitching 14 is overlock stitching binding the edges 10 and 11 together. The overlock stitching provides a significantly greater number of stitch points 35 and significantly more thread is used to create the stitching in comparison to the straight stitching on an equal length of edging. This results in a much sturdier sewing seam along the edges 10, 11 of the seat cover body perimeter and the seat cover skirt.

Figure 4B:
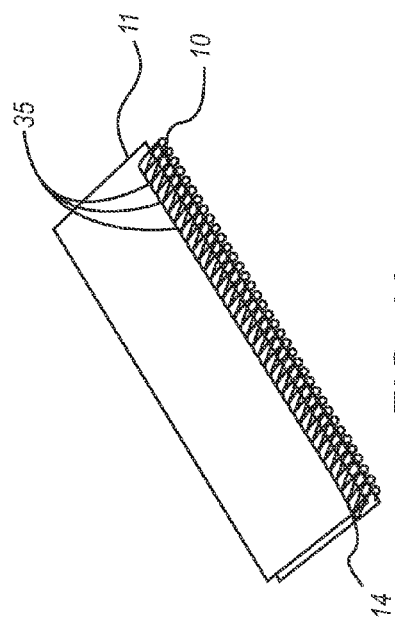
FIG. 4B is a perspective view of a particular implementation of a seat cover body and skirt edge sewn together with a straight stitch and a zigzag stitch.

FIG. 4B illustrates a portion of the edges 10, 11 of the respective seat cover skirt 8 and seat cover body 4 stitched together with the first stitching 14 along a majority of the edges in the automobile seat cover 2. In the embodiment shown in FIG. 4B of the seat cover body outer edge 11 and the seat cover skirt first edge 10 are sewn together using zigzag stitch in addition to a straight stitch. This combination of two separate stitches forms the first stitching 14 and provides a strong finished edge.

FIG. 5 illustrates a rear view of a particular implementation of a seat cover 2, wherein the rear view of the seat cover 2 shows the seat cover skirt 8 with its first edge 10 (FIG. 2) sewn to the outer perimeter edge 11 (FIG. 2) of the seat cover body 4 and its second edge 46, opposite the first edge 10, forming a seat cover opening 48 on the seat cover skirt 8. In a particular implementation of the seat cover 2, the second edge 46 is coupled to a tie element 50 which helps to secure the seat cover 2 to an automobile seat either by directly tying to the seat, gathering the edges of the seat cover opening 48 (like a draw string around the opening 48 or with an elastic banded edge to gather the edges of the seat cover opening 48), or by some other method. In the particular implementation of FIG. 5, the second stitching 12 secures the edges of the seat cover base 4 and the seat cover skirt 8 together along two different limited lengths and the remainder of the edges of the seat cover base 4 and the seat cover skirt 8 are sewn together with the first stitching 14 using a much stronger stitch. This enables the seat cover to be used either as a passenger side seat cover or a driver side seat cover and still allow the second stitching 12 area to be positioned over the air bag of the automobile seat which is typically placed along the door side of the seat. The precise location of the second stitching 12 (or safety zone) area may be identified by the different color of thread used which is visually identifiable on the seat cover 2 in implementations that include brightly colored thread for the second stitching 12, or in particular implementations by a tag 52 extending out from the location of the second stitching 12.

FIG. 6A illustrates a particular embodiment of an automobile seat 60 comprising an air bag assembly 62 positioned within the seat 60 and extendable through the automobile seat side wall 64 upon inflation. In particular embodiment of the automobile seat 60, the air bag assembly 62 is positioned adjacent to at least one side wall 64 of the seat rest 66 which extends from the seat base 68.

FIG. 6B illustrates a seat cover 2 enclosing on the automobile seat 60 (FIG. 6A), wherein the second stitching 12 is positioned over the air bag assembly 62, and the remainder of the seat cover base is coupled to the seat cover skirt with first stitching 14. The second stitching 12, for example straight stitching, has a propensity to break against the pressure exerted from the air bag assembly 62 when the air bag deploys, and allows the air bag to eject from within the automobile seat by breaking the thread at the second stitching 12 through the seat cover 2.

It will be understood that implementations are not limited to the specific components disclosed herein, as virtually any components consistent with the intended operation of a method and/or system implementation for the automobile seat cover may be utilized. Accordingly, for example, although particular automobile seat covers may be disclosed, such components may comprise any shape, size, style, type, model, version, class, grade, measurement, concentration, material, weight, quantity, and/or the like consistent with the intended operation of a method and/or system implementation for an automobile seat cover may be used.

In places where the description above refers to particular implementations of an automobile seat cover, it should be readily apparent that a number of modifications may be made without departing from the spirit thereof and that these implementations may be applied to other automobile seat covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An automobile seat cover comprising:
    a seat cover body comprising an outer perimeter; and
    a seat cover skirt comprising at least one first edge portion, stitched by a first stitch to the seat cover body for a majority of an outer perimeter of the seat cover body, at least two second edge portions opposing each other on the outer perimeter of the seat cover body, each second edge portion stitched by a second stitch different from the first stitch for a remainder of a stitched outer perimeter portion of the seat cover body, wherein the second stitch is weaker and more prone to breakage than the first stitch, and a tie element coupled to the seat cover skirt distal from the first edge portion and the second edge portions, the tie element extending for a majority of the seat cover skirt around a seat opening in the seat cover;
    wherein a majority of the first and second edges of the seat cover body and the seat cover skirt comprise an overlock stitch;
    wherein the at least one second edge is positioned on an automobile seat cover corresponding to at least one airbag installed in an automobile seat over which the seat cover is to be placed; and
    wherein each of the seat cover skirt and the seat cover body is separately finished with an overlock stitch and are subsequently stitched together.

2. The automobile seat cover of the claim 1, wherein the first stitch is at least one of a cover stitch, an overlock stitch, a zigzag stitch, two parallel straight stitches and two parallel lock stitches.

3. The automobile seat cover of the claim 1, wherein the second stitch is one of a single straight stitch and a single lock stitch.

4. The automobile seat cover of the claim 1, wherein the second stitch is one of a straight stitch and a lock stitch.

5. The automobile seat cover of the claim 1, wherein the first stitch uses a first string color and the second stitch uses a second string color different from the first string color.

6. The automobile seat cover of the claim 5, wherein the second string color is a brightly colored string color.

7. The automobile seat cover of the claim 6, wherein the second string color is orange.

8. The automobile seat cover of the claim 1, wherein the seat cover body further comprises a padded surface layer.

\* \* \* \* \*